United States Patent [19]

Stroud et al.

[11] Patent Number: 4,997,080
[45] Date of Patent: Mar. 5, 1991

[54] SPIKE CHAIN ASSEMBLY

[75] Inventors: Brian T. Stroud, Richmond; Jack Weavell, Coquitlam, both of

[73] Assignee: CAE Machinery Ltd., Vancouver, Canada

[21] Appl. No.: 487,003

[22] Filed: Mar. 1, 1990

Related U.S. Application Data

[63] Continuation-in-part of Ser. No. 856,436, Apr. 22, 1986, abandoned, which is a continuation of Ser. No. 597,153, Apr. 5, 1984, abandoned.

[51] Int. Cl.$^5$ .............................................. B65G 15/42
[52] U.S. Cl. .................................... 198/692; 198/837; 198/841; 144/245 A
[58] Field of Search ............... 198/692, 693, 837, 841, 198/860.3; 144/242 D, 245 A, 245 D; 83/423, 435.2

[56] References Cited

U.S. PATENT DOCUMENTS

| | | | |
|---|---|---|---|
| 2,864,412 | 12/1958 | Ponder | 144/245 A |
| 3,511,360 | 5/1970 | Jagiel | 198/841 |
| 3,788,455 | 1/1974 | Dieckmann, Jr. | 198/841 |
| 3,848,732 | 11/1974 | Catalano | 198/837 |
| 3,856,358 | 12/1974 | Krekeler | 474/140 |
| 3,858,713 | 1/1975 | Allen | 198/692 |
| 4,358,010 | 11/1982 | Besch | 198/841 |

Primary Examiner—Joseph E. Valenza
Attorney, Agent, or Firm—Townsend and Townsend

[57] ABSTRACT

A conveyor chain trackway to receive a chain. The chain has first and second links, the latter alternating with the first. Each first and second link comprises a pair of spaced side members. There is a pivotal joint between neighbouring links. Spikes are formed on a plurality of first links to receive and locate a load. The trackway comprises a base member in the low friction layer on the base member and dimensioned to receive the second links. Side plates are spaced from each side of the base member. The side plates extend upwardly to be alongside the chain when the chain is in position. The side plates can be adjusted on the base to vary the distance from the base. Low friction distance pieces on the inner side of the side plate extend to contact and locate the chain. The chain is thus held on a fixed course and movement inwardly of the low friction distance pieces can compensate for wear in the chain.

10 Claims, 1 Drawing Sheet

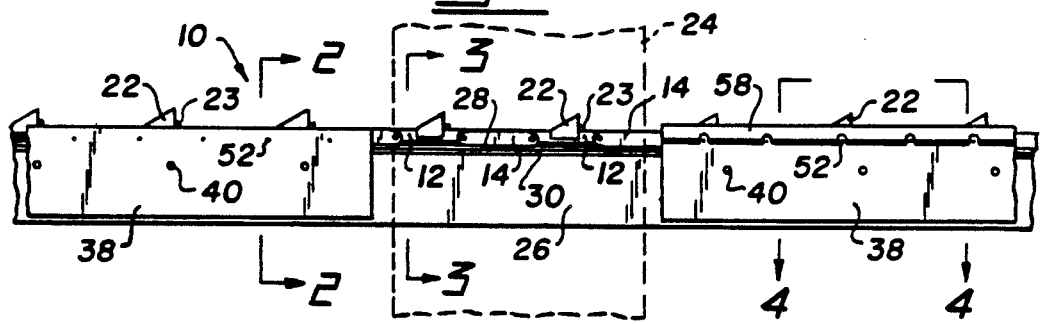
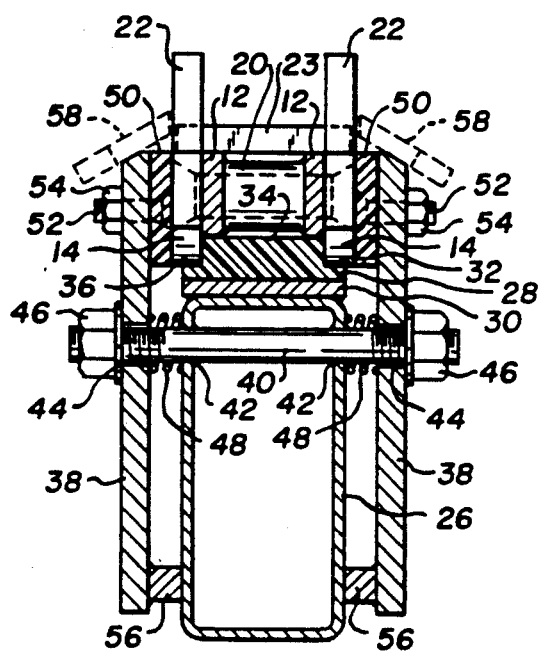
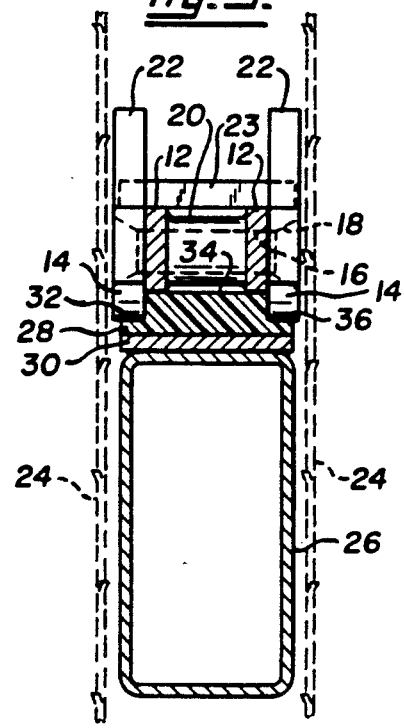
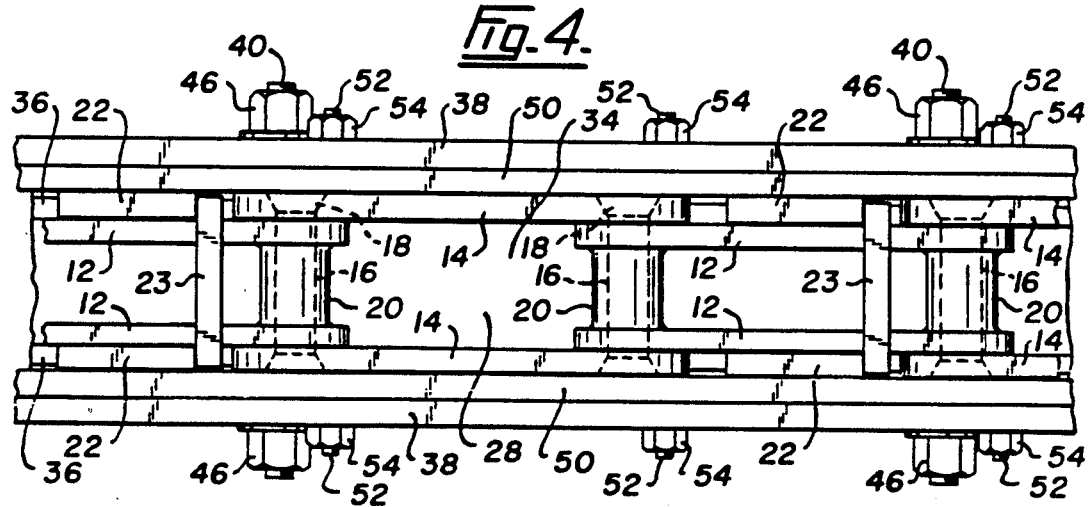

SPIKE CHAIN ASSEMBLY

FIELD OF THE INVENTION

This invention relates to a conveyor chain trackway, particularly a conveyor chain trackway useful in feeding logs in a saw mill having band saws or circular saws, and/or chipping heads.

DESCRIPTION OF THE PRIOR ART

The feeding of logs to a saw by the use of a conveyor is well established in the lumber industry. A disadvantage with the feeding of logs in this manner is that small movements of the chain, inevitable from the structure of the chain, produce a corresponding shifting of the logs. Such shifting is undesirable as it results either in an inaccurate cut or, in extreme cases, damage to the saw. In a saw mill the saws are typically arranged in pairs, one or two on each side of the conveyor chain, the saws being positioned at a distance slightly greater than the width of the chain at their closest position.

U.S. Pat. No. 3,858,713 issued Jan. 7, 1975 to Allen describes and claims a log feed conveyor now used in saw mills in North America. Allen teaches a conveyor for feeding logs through band mills. The chain of the conveyor has flange links with flange side bars alternating with the connecting links and runs on a chainway. Flange side bars straddle the side walls of the chainway and reduce rotation and lateral deviation of the link. There are wear blocks extending between the side bars to transfer loads on the chain to the upper wall of the chainway. As indicated the conveyor in Allen has achieved considerable commercial success but has a disadvantage in that there is no side adjustment to compensate for chain and chainway wear. As a result the chain is allowed to move during the log sawing operation when the chain and the chainway are worn and this results in a variation in cutting width.

SUMMARY OF THE INVENTION

The present invention seeks to provide an improvement in log feed conveyors that is applicable to all prior art log feed conveyor systems, including the above system described and claimed in U.S. Pat. No. 3,858,713.

Accordingly, the present invention provides a conveyor chain trackway to receive a chain, the chain comprising a plurality of first links; a plurality of second links, alternating with the first links; each first and second link comprising a pair of spaced side members; pivotal joints between neighboring links; spikes formed on a plurality of first links to receive and locate a load, the trackway comprising a base member; a wear material on the base member and dimensioned to receive the second links; side plates spaced from each side of the base member, the side plates extending upwardly to be alongside the chain when the chain is in position; means adjustably locating the side plates on the base at a predetermined distance from the base; low friction distance pieces on the inner side of the side plate extending to contact and locate the chain whereby the chain is held on a fixed course and movement inwardly of the low friction distance pieces can compensate for wear in the chain.

Typically the side plates are adjustably located on the base by studs attached to and extending from the base. There are openings in the plate to engage the studs so that nuts may be engaged on the studs to hold the plates in position. This affords an extremely simple means of adjusting for wear in the chain and in the chainway. The adjustment may be carried out when the chain is in motion, that is the equipment is in use, or when the chain is still.

In a further preferred embodiment there are second distance pieces extending from the plates of the base at the lower edge of the plates, remote from the low friction distance pieces. These second distance pieces act as fulcrums.

Desirably the low friction distance pieces are releasably attached, for example by countersunk bolts, to facilitate removal and replacement of the distance pieces.

DRAWINGS

Aspects of the invention are illustrated, by way of example, in the accompanying drawings in which:

FIG. 1 is a side elevation showing a general arrangement according to the present invention;

FIG. 2 is a section on the line 2—2 in FIG. 1;

FIG. 3 is a section on the line 3—3 in FIG. 1; and

FIG. 4 is a plan view on the line 4—4 in FIG. 1.

DESCRIPTION OF THE PREFERRED EMBODIMENT

The drawings illustrate a conveyor chain trackway 10 to receive a chain. As shown particularly in FIG. 4 the chain comprises a plurality of first links each comprising a pair of spaced side members 12. The first links are within, and pivotally attached to, a plurality of second links each comprising side members 14. There are pivotal joints between neighboring first and second links. As is conventional these pivotal joints comprise pins 16 attached to the second link side members 14 at 18, for example by welding. There are bushes 20 attached to the side members 12 at each end of each first link and the bushes 20 are dimensioned to be a bearing fit on the pins 16. There are spikes 22 formed on the side members 12 of each first link, generally one per link, but they may be arranged otherwise, for example on each alternate first link. The spikes 22 engage and locate a log on the conveyor chain and take the log to the band saws 24 shown in broken lines in FIG. 3. The spikes 22 may be braced by cross bars 23.

The trackway comprises a base member 26, shown most clearly in FIGS. 2 and 3. There is a wear material 28 on the base member 26 mounted on a carrier plate 30 welded to the base member 26. The wear material 28, typically of ultrahigh molecular weight polyethylene or some other similar, known low friction wear material, is formed with side channels 32 to receive the second links and with a raised center piece 34 dimensioned to receive the second links and to contact them at 36. The trackway has side plates 38 spaced from each side of the base member 26. These side plates 38, as shown most clearly in FIG. 2, extend upwardly to be alongside the chain when the chain is in position on the trackway 10. The side plates 38 are adjustably located on the base 26 at predetermined distances from the base. In the illustrated embodiment the adjustable location is by studs 40 located, for example by welding at 42, in the base member 26 and extending outwardly. There are openings 44 in the plate to engage the studs 40. Nuts 46 engage the studs 40 to restrict outward movement of the plates 38. Springs 48 provide resilient location of the plates 38, acting to force the plates 38 out against nuts 46.

At the upper edges of the plates there are low friction distance pieces 50 positioned on the inner sides and extending to contact and to locate the chain—see FIGS. 2 and 3. The low friction distance pieces 50 are located by bolts 52 extending through openings provided in the upper edges of the side plates and engaged by nuts 54. The bolts countersunk heads to ensure that contact with the chain is made only by the low friction material 50.

In the preferred embodiment illustrated there are second distance pieces 56 attached, for example by welding, to the plates 38 at the base of each plate, remote from the low friction distance pieces. Pieces 56 act as fulcrums or pivots for the plates 38.

The illustrated chain is moved, in conventional manner, by a driven sprocket (not shown) engaging the bushes 20.

It should be noted from FIGS. 1 and 3 that where the saws 24 are positioned the plates 38 are interrupted locally to avoid damage to the saws.

As is conventional outfeed shears 58 are positioned on both sides of the chainway on the outfeed side of saws 24.

In use the chain conveys logs along the trackway in conventional manner. The important feature of the present invention is that the distance pieces 50 engage and locate the chain, typically at the points where the spikes 22 and second links are positioned, that is the position of maximum width of the chain, to hold the chain on a fixed course. When wear takes place in the chain or in the trackway the wear can be compensated for by simply tightening the nuts 46. This tightening of the nuts can be carried out when the chain is moving or when it is still.

Similarly, should the low friction material 50 wear beyond the point where adjustment can compensate for the wear, replacement is a simple matter of loosening nuts 54, removing bolts 52 and the low friction material, replacing the material and then bolting it in position. Desirably the nuts 46 and 54 may be of the self-locking type, for example by the use of nylon inserts.

Thus by simple adjustment to the nuts 46 moving the plates 38 and thus the low friction material 50 inwardly, the problem of chainway wear and chain wear is eliminated and the life of the chain may be extended.

I claim:

1. A conveyor chain trackway to receive a chain, the chain comprising:
   a plurality of first links;
   a plurality of second links, alternating with the first links;
   each first and second link comprising a pair of spaced side members having outer and inner lateral surfaces;
   pivotal joints between neighboring links;
   spikes formed on a plurality of first links to receive and locate a load, the trackway comprising:
   a base member;
   side plates spaced from each side of the base member, the side plates extending upwardly to be alongside the chain when the chain is in position;
   low friction distance pieces on the inner sides of the side plates extending to contact and locate a flat outer surface of the chain to prevent outward movement of the chain whereby the chain is held on a fixed course and movement inwardly of the low friction distance pieces can compensate for wear in the chain; and
   means for adjustably positioning the low friction distance pieces toward the chain so the low friction distance pieces contact and locate the outermost of the outer lateral surfaces of the spaced side members to laterally support the chain, the adjustable positioning means including user manipulable continuous adjustment means operable by the user while the chain moves between the low friction distance pieces.

2. The trackway as claimed in claim 1 further comprising a wear material supported by the base member.

3. A trackway as claimed in claim 2 including a carrier plate attached to the base and carrying the wear material.

4. A trackway as claimed in claim 1 in which the conveyor chain is used to feed logs to a saw, the side plates being absent at the saw location.

5. A trackway as claimed in claim 1 in which the adjustable positioning means includes side plates adjustably located on the base by studs attached to and extending from the base, and wherein the plates have openings to engage the studs whereby nuts may be engaged on the studs to hold the plates in position.

6. A trackway as claimed in claim 5 including second distance pieces extending from the plates to the base at the lower edge of each plate, remote from the low friction distance pieces and able to act as a fulcrum for movement of the side plates.

7. A trackway as claimed in claim 1 in which the low friction distance pieces are releasablY attached to the plate to facilitate removal and replacement.

8. The trackway as claimed in claim 2 wherein the wear material contacts the inner lateral surfaces of the spaced side members of at least one of the first and second links so to prevent inward lateral movement of the links.

9. The trackway as claimed in claim 1 wherein the adjustable positioning means includes means for biasing the low friction distance pieces towards the outer lateral surfaces of the spaced side members.

10. A conveyor chain trackway to receive a chain the chain comprising:
    a plurality of first links;
    a plurality of second links, alternating with the first links;
    each first and second link comprising a pair of spaced side members;
    pivotal joints between neighboring links;
    spikes formed on a plurality of first links to receive and locate a load, the trackway comprising:
    a base member;
    a wear material on the base member and dimensioned to receive the second links and to prevent inward movement of the links;
    side plates spaced from each side of the base member, the side plates extending upwardly to be alongside the chain when the chain is in position;
    means adjustably locating the side plates on the base at a predetermined distance from the base, the adjustable locating means including threaded studs, passing through openings in the plates, attached to and extending from the base and nuts engaged on the studs;
    low friction distance pieces on the inner sides of the side plates extending to contact and locate a flat outer surface of the chain to prevent outward movement of the chain whereby the chain is held on a fixed course and movement inwardly of the low friction distance pieces can compensate for wear in the chain; and
    second distance pieces extending from the plates to the base at the lower edge of each plate, remote from the low friction distance pieces and able to act as a fulcrum for movement of the side plates.

* * * * *